(12) United States Patent
Menon et al.

(10) Patent No.: US 11,465,482 B2
(45) Date of Patent: Oct. 11, 2022

(54) VEHICLE BATTERY PACK SUPPORT DEVICE

(71) Applicants: Daimler AG, Stuttgart (DE); AVL List GmbH, Graz (AT)

(72) Inventors: Vikram Menon, Kawasaki (JP); Markus Uhl, Kawasaki (JP); Roland Macherhammer, Graz (AT); Peter Del Negro, Graz (AT)

(73) Assignees: Daimler AG, Stuttgart (DE); AVL List GmbH, Graz (AT)

( * ) Notice: Subject to any disclaimer, the term of this patent is extended or adjusted under 35 U.S.C. 154(b) by 163 days.

(21) Appl. No.: 17/047,650

(22) PCT Filed: Apr. 26, 2019

(86) PCT No.: PCT/JP2019/017837
§ 371 (c)(1),
(2) Date: Oct. 14, 2020

(87) PCT Pub. No.: WO2019/208750
PCT Pub. Date: Oct. 31, 2019

(65) Prior Publication Data
US 2021/0146765 A1 May 20, 2021

(30) Foreign Application Priority Data
Apr. 27, 2018 (JP) .............................. JP2018-086974

(51) Int. Cl.
*B60K 1/04* (2019.01)
*B60L 50/64* (2019.01)
(Continued)

(52) U.S. Cl.
CPC ................ *B60K 1/04* (2013.01); *B60L 50/64* (2019.02); *H01M 50/209* (2021.01); *H01M 50/249* (2021.01); *H01M 2220/20* (2013.01)

(58) Field of Classification Search
CPC .... B60L 50/66; B60K 1/04; B60K 2001/0438
See application file for complete search history.

(56) References Cited

U.S. PATENT DOCUMENTS 9,061,712 B2 * 6/2015 Patberg ................ B62D 21/157
10,493,837 B1 * 12/2019 Angelo ................... B60L 50/66
(Continued)

FOREIGN PATENT DOCUMENTS

| CN | 103568805 A | * | 2/2014 | ............... B60K 1/04 |
| CN | 203871400 U | | 10/2014 | |

(Continued)

OTHER PUBLICATIONS

PCT/JP2019/017837, International Search Report dated Jun. 11, 2019 (One (1) page).

(Continued)

*Primary Examiner* — Katy M Ebner
(74) *Attorney, Agent, or Firm* — Crowell & Moring LLP (57) ABSTRACT

A support device of a vehicle battery pack of a vehicle. The vehicle battery pack includes a first battery accommodating portion disposed in a first space of the vehicle and a second battery accommodating portion, where the second battery accommodating portion is greater in a vehicle-widthwise dimension than the first battery accommodating portion, where the second battery accommodating portion is connected to the first battery accommodating portion, where the second battery accommodating portion is disposed in a second space, and where the second space is below the first space in a vehicle-heightwise dimension. A frame-side bracket is disposed at a vehicle-widthwise outer surface of a web of a side rail of a ladder frame of the vehicle and projects outward in a vehicle-widthwise direction and a connecting member elastically connects the second battery (Continued)

accommodating portion to the frame-side bracket to suspend the vehicle battery pack to the ladder frame.

5 Claims, 4 Drawing Sheets

(51) Int. Cl.
  *H01M 50/249* (2021.01)
  *H01M 50/209* (2021.01)

(56) References Cited

U.S. PATENT DOCUMENTS

| | | | | |
|---|---|---|---|---|
| 10,559,858 B2 * | 2/2020 | Goitsuka | ................... | A62C 3/16 |
| 11,040,610 B2 * | 6/2021 | Sloan | ..................... | B60L 50/64 |
| 2012/0090907 A1 * | 4/2012 | Storc | ....................... | B60L 50/66 |
| | | | | 180/68.5 |
| 2013/0327583 A1 * | 12/2013 | Nitawaki | ................ | B60L 50/16 |
| | | | | 180/68.5 |
| 2014/0338999 A1 * | 11/2014 | Fujii | ....................... | B60L 58/26 |
| | | | | 180/68.5 |
| 2016/0190526 A1 * | 6/2016 | Yamada | ................ | H01M 50/20 |
| | | | | 180/68.5 |
| 2017/0069886 A1 | 3/2017 | Liu et al. | | |
| 2018/0062125 A1 * | 3/2018 | Kaneshige | ............... | B60K 1/04 |
| 2019/0229314 A1 * | 7/2019 | Ribbentrop | ........... | B66F 9/0759 |
| 2021/0362579 A1 * | 11/2021 | Kumagai | ............... | B62D 21/09 |

FOREIGN PATENT DOCUMENTS

| | | | | |
|---|---|---|---|---|
| EP | 3 095 146 B1 | 11/2016 | | |
| FR | 2946593 A1 * | 12/2010 | ............... | B60K 1/04 |
| JP | 9-98517 A | 4/1997 | | |
| JP | 2016-113063 A | 6/2016 | | |
| JP | 2018187976 A * | 11/2018 | | |
| JP | 2021030947 A * | 3/2021 | | |
| WO | WO 2015/165407 A1 | 11/2015 | | |
| WO | WO-2021200833 A1 * | 10/2021 | | |
| WO | WO-2022036364 A1 * | 2/2022 | | |

OTHER PUBLICATIONS

U.S. Patent Application, "Vehicle Battery Housing, Vehicle Battery Pack and Electric Vehicle", filed Oct. 14, 2029, Inventor Vikram Menon et al.

* cited by examiner

VEHICLE BATTERY PACK SUPPORT DEVICE

TECHNICAL FIELD

The present invention relates to a support device for a vehicle battery pack mounted on an electric vehicle such as a full electric car and a hybrid electric car.

BACKGROUND ART

From a viewpoint of reducing environmental burdens, development of electric vehicles, such as full electric cars using a motor as a power source for propulsion in place of an internal combustion engine which used as an engine and hybrid electric cars using both an internal combustion engine and a motor, has been progressing. In such electric vehicles, a battery for driving the motor is mounted. Supplied with electricity from the battery, the motor generates power to move the vehicle.

In recent years, also in the field of commercial vehicles such as trucks, development of electric vehicles has been being promoted. For example, Patent Document 1 discloses a battery box holding structure for a commercial vehicle which provides improved collision safety.

CITATION LIST

Patent Document

[Patent Document 1] Japanese Patent Laid-Open No. 2016-113063

SUMMARY OF THE INVENTION

Problem to be Solved by the Invention

However, commercial vehicles, which are configured to carry cargo and large in size, have a great vehicle weight as compared with passenger cars. In the field of commercial vehicles having a great vehicle weight as compared with passenger cars, in order to put an electric vehicle with a sufficient travel range into practical use, increasing the battery on-board capacity of the electric vehicle is an important issue. Further, regarding the commercial vehicles which are likely to experience external force applied from a road surface and causing vibration, etc. during traveling, as compared with passenger cars, not only an increase in battery on-board capacity but also keeping reliability of batteries is required.

The present invention has been made in view of the above problem. An object of the present invention is to provide a support device for a vehicle battery pack configured to provide an increased battery on-board capacity for an electric vehicle, which can reduce the influence of external force, applied to the vehicle during traveling, upon the vehicle battery pack, thereby improving the reliability thereof.

Arrangement for Solving the Problem (1) The vehicle battery pack support device according to the embodiment is intended for a vehicle battery pack comprising a first battery accommodating portion arranged in a first space between two side rails constituting a ladder frame of a vehicle, a second battery accommodating portion greater in vehicle-widthwise dimension than the first battery accommodating portion and connected to the first battery accommodating portion to be located in a second space vehicle-heightwise below the first space, and batteries held in the first and second battery accommodating portions. The support device comprises a frame-side bracket provided at a vehicle-widthwise outer surface of a web of a side rail of the ladder frame to project vehicle-widthwise outward, and a connecting member elastically connecting the second battery accommodating portion to the frame-side bracket to suspend the vehicle battery pack to the ladder frame.

The vehicle battery pack support device according to the embodiment enables the vehicle battery pack, configured to provide an increased battery on-board capacity, to be suspended to the ladder frame, elastically, by virtue of the connecting member. Thus, if, during traveling, an external force which may cause vibration, etc. in the ladder frame is applied from a road surface via wheels, the connecting member absorbs the external force, thereby reducing transmission of the external force to the vehicle battery pack. Since the influence of external force on the battery pack is reduced in this manner, the battery pack mounted on the vehicle has improved reliability. The vehicle battery pack support device according to the embodiment can thus reduce the influence of external force, applied to the vehicle during traveling, upon the battery pack configured to provide an increased battery on-board capacity for the vehicle, thereby improving the reliability thereof.

(2) The vehicle battery pack support device described in paragraph (1) above may further comprise a battery-side bracket provided at a vehicle-widthwise outer surface of the second battery accommodating portion to project vehicle-widthwise outward. The battery-side bracket helps firm and reliable attachment of the connecting member to the second battery accommodating portion, leading to improved reliability of the battery pack mounted on the vehicle.

(3) In the vehicle battery pack support device described in paragraph (2) above, the battery-side bracket may be provided in a manner avoiding a weld included in a housing composed of the first and second battery accommodating portions. When the support device is provided avoiding a weld which is relatively low in stiffness, the influence of external force transmitted via the battery-side bracket is reduced, leading to improved strength reliability of the battery housing. Accordingly, the battery pack is mounted with a decrease in reliability suppressed.

(4) In the vehicle battery pack support device described in paragraph (3) above, the battery-side bracket may be provided at a location away from a vehicle-longitudinal end of the housing. In this case, the influence of external force transmitted via the battery-side bracket is reduced, leading to improved strength reliability of the battery housing. Accordingly, the battery pack is mounted with a decrease in reliability suppressed.

(5) In the vehicle battery pack support device described in any of paragraphs (1) to (4) above, the frame-side bracket may be connected to the web of the side rail with an adjustment plate interposed between them for regulating the amount of projection from the side rail. In this case, the amount of projection of the frame-side bracket from the side rail can be regulated. Thus, if the vehicle-widthwise dimension of the second battery accommodating portion is changed, the connecting member can be arranged at an appropriate position by regulating the amount of projection of the frame-side bracket from the side rail, without the need to change the vehicle-widthwise dimensions of the frame-side and battery-side brackets. This eliminates the need to prepare a variety of frame-side and battery-side brackets different in size according to battery packs different in size, thus allowing standardization of components, leading to a reduction in cost related to supporting the battery pack.

MODE OF CARRYING OUT THE INVENTION

With reference to the accompanying drawings, configurations of embodiments of the present invention will be described in detail.

First Embodiment

Figure 1:
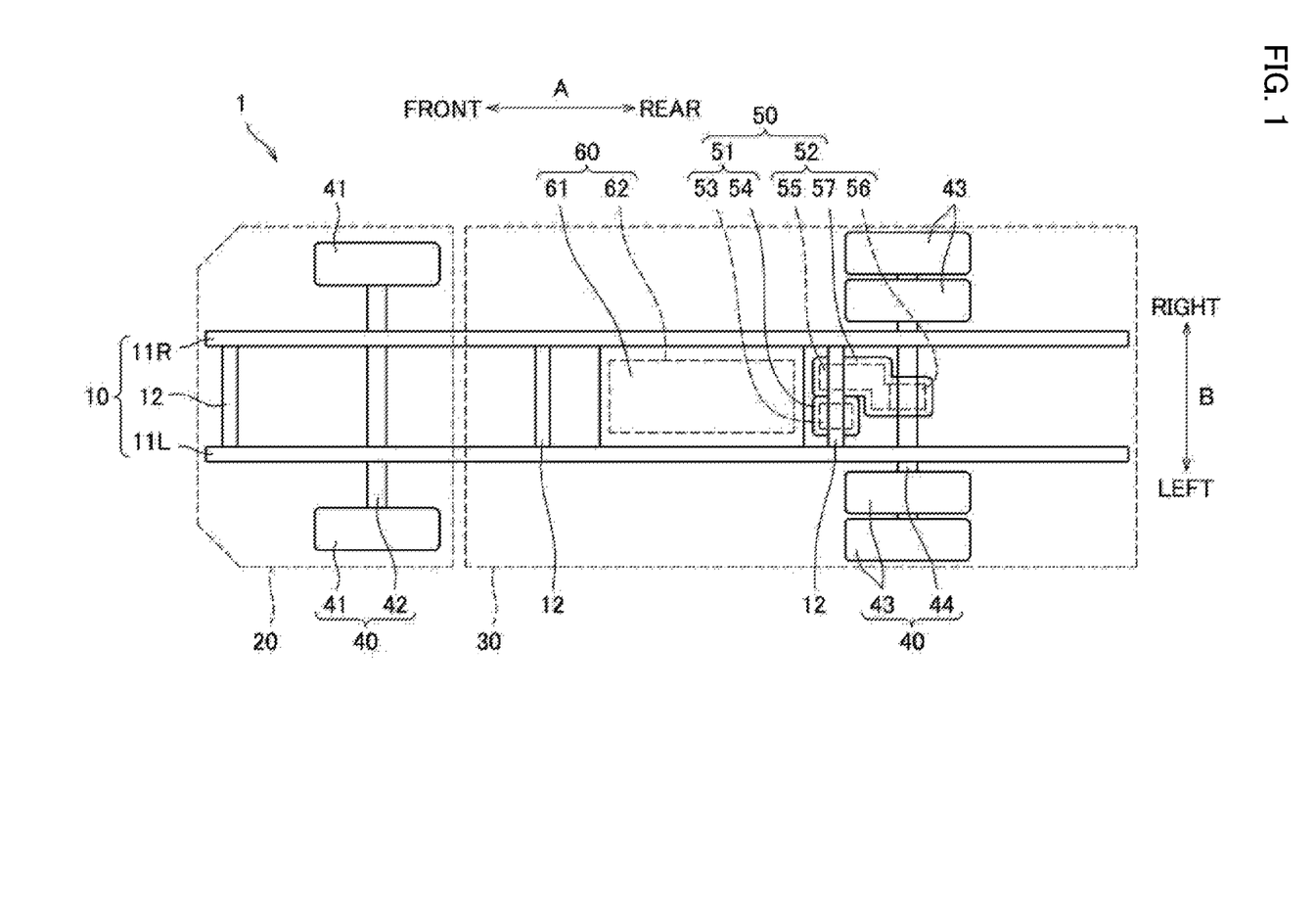
FIG. 1 is a top view schematically showing the total structure of an electric vehicle equipped with vehicle battery pack support devices according to a first embodiment of the present invention.

First, with reference to FIG. 1, the total structure of an electric vehicle 1 equipped with vehicle battery pack support devices according to a first embodiment will be described. FIG. 1 is a top view schematically showing the total structure of the electric vehicle equipped with vehicle battery pack support devices according to the first embodiment.

As shown in FIG. 1, the electric vehicle 1 to which the support device according to the first embodiment is applied is an electric truck comprising a ladder frame 10, a cab 20, a cargo box 30, wheel mechanisms 40, a drive apparatus 50 and a battery pack 60. FIG. 1 represents the ladder frame, etc. seen from the top of the electric vehicle 1 through the cab 20 and the cargo box 30.

Although in the present example, the electric vehicle 1 is a full electric car having a motor (electric motor) as a drive source for propulsion, the electric vehicle 1 may be a hybrid electric car having also an engine. Further, the electric vehicle 1 is not limited to an electric truck but may be another commercial vehicle equipped with a battery for moving the vehicle.

The ladder frame 10 comprises a left side rail 11L, a right side rail 11R and cross-members 12. The left side rail 11L and the right side rail 11R extend in the longitudinal direction A of the electric vehicle 1. They are separated from each other in the lateral (width) direction B of the vehicle and parallel to each other. The left side rail 11L and the right side rail 11R are connected by the cross-members 12 to form a ladder-shaped frame 10 called a ladder frame. The ladder frame 10 supports the cab 20, the cargo box 30, the drive apparatus 50, the battery pack 60 and other heavy objects mounted on the electric vehicle 1. Hereinafter, the left side rail 11L and the right side rail 11R will be sometimes referred to simply as side rails 11.

The cab 20 is a structure with a driver's seat, not shown, and arranged over the front of the ladder frame 10. The cargo box 30 is a structure into which cargo to be transported by the electric vehicle 1 is loaded, and arranged over the rear of the ladder frame 10.

In the present example, the wheel mechanism 40 arranged in the front of the vehicle includes left and right front wheels 41 and a front axle 42, or shaft for the two front wheels 41. The wheel mechanism 40 arranged in the rear of the vehicle includes rear wheels 43, specifically two left rear wheels and two right rear wheels, and a rear axle 44, or shaft for the rear wheels 43. In the electric vehicle 1, the rear wheels 43 are drive wheels to which drive power is transmitted to move the electric vehicle 1. The wheel mechanisms 40 are each connected to the ladder frame 10 by a suspension mechanism, not shown, and thus, support the weight of the electric vehicle 1.

The drive apparatus 50 comprises a motor unit 51 and a gear unit 52. The motor unit 51 comprises a motor 53 and a motor housing 54 enclosing the motor 53. The gear unit 52 comprises a speed reducing mechanism 55 consisting of a plurality of gears, a differential mechanism 56 which distributes power transmitted from the speed reducing mechanism 55 to the left and right rear wheels 43, and a gear housing 57 enclosing the speed reducing mechanism 55 and the differential mechanism 56.

The drive apparatus 50 is configured such that drive torque generated by the motor 53 is reduced by the speed reducing mechanism 55 to a level suited for moving the vehicle and transmitted via the differential mechanism 56 to the rear axle 44. The drive apparatus 50 can thus rotate the rear wheels 43 via the rear axle 44, thereby moving the electric vehicle 1. In the present example, the drive apparatus 50 is arranged to a laterally (vehicle-widthwise) inner side of each side rail 11L, 11R (in other words, in the space between the side rails) and connected to the ladder frame 10 by support members, not shown.

The battery pack 60 comprises a plurality of batteries 61 which supplies electricity to the motor 53 and thus functions as an energy source for moving the electric vehicle 1, and a battery housing 62 enclosing the batteries 61. The battery pack 60 is a large-capacity secondary battery of relatively large size to store electricity required for the electric vehicle 1. In the present example to which the support device according to the first embodiment is applied, the battery pack 60 is arranged in the vehicle, longitudinally in front of the drive apparatus 50 and laterally (vehicle-widthwise) between the left and right side rails 11L, 11R. Specifically, the battery pack 60 is suspended to the ladder frame 10 by support devices described later. The detailed description of arrangement of the battery pack 60 relative to the side rails 11 will be given later.

Figure 2:
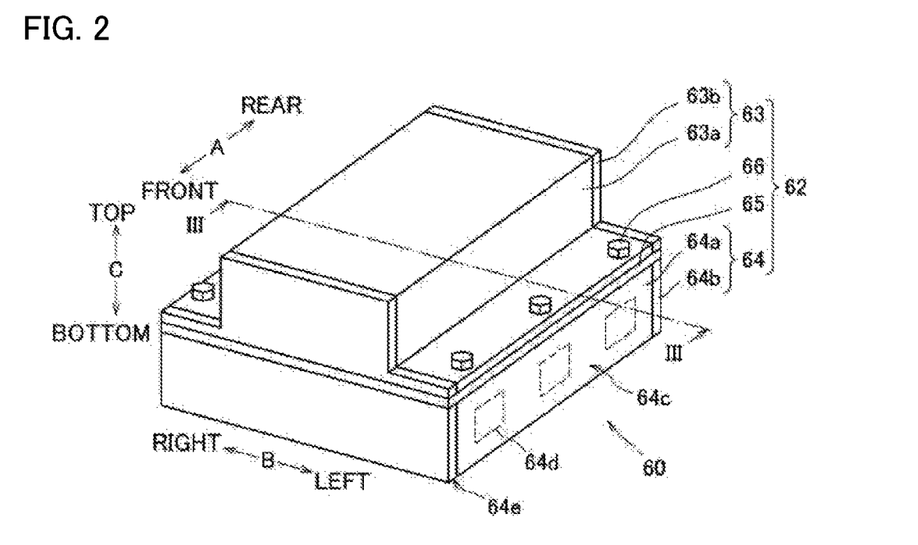
FIG. 2 is a perspective view of a battery housing to which the support device according to the first embodiment of the present invention is applied.
Figure 3:
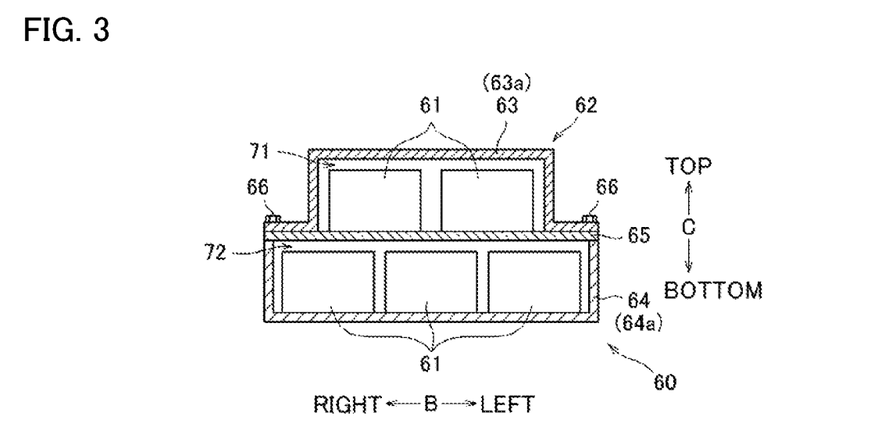
FIG. 3 is a cross-sectional view along line III-III in FIG. 2.

Next, with reference to FIGS. 2 and 3, the configuration of the battery pack 60 will be described. FIG. 2 is a perspective view of the battery housing 60 to which the support device according to the first embodiment is applied. FIG. 3 is a cross-sectional view along line III-III in FIG. 2.

As seen from FIG. 2, the battery pack 60 has a shape extending in the longitudinal direction A of the vehicle and having an inverted T-shaped cross-section parallel in the plane determined by the lateral (width) direction B and the vertical (height) direction C of the vehicle.

As shown in FIGS. 2 and 3, the battery housing 62 constituting the battery pack 60 comprises a first battery accommodating portion 63, a second battery accommodating portion 64, a partition 65, and joining elements 66. The first and second battery accommodating portions 63, 64 are box-shaped casings for holding batteries, open at one side. The first battery accommodating portion 63 consists of a casing body 63a and two side walls 63b welded to longitudinal (vehicle-lengthwise) ends of the body 63a. Likewise, the second battery accommodating portion 64 consists of a casing body 64a and two side walls 64b welded to longitudinal (vehicle-lengthwise) ends of the body 64a.

The first and second battery accommodating portions 63, 64 are arranged with their open sides facing each other with the partition 65 interposed between them. The first and second battery accommodating portions 63, 64 and the partition 65 are joined together by the joining elements 66 inserted into the second battery accommodating portion 64 through the first accommodating portion 63 and the partition 65.

The battery housing 62 constructed this way has a cuboidal first battery holding space 71 delimited by the first battery accommodating portion 63 and the partition 64 and a cuboidal second battery holding space 72 delimited by the second battery accommodating portion 64 and the partition 72. The first and second battery holding spaces 71, 72 are thus separated by the partition 65.

As shown in FIG. 3, the second battery accommodating portion 64 is greater in size than the first battery accommodating portion 63, and the second battery holding space 72 is greater in size than the first battery holding space 71. Specifically, the second battery accommodating portion 64 is greater in width, or dimension parallel to the lateral (width) direction B of the vehicle than the first battery accommodating portion 63, and approximately equal in dimension parallel to the longitudinal (length) direction A and dimension parallel to the vertical (height) direction C of the vehicle to the first battery accommodating portion 63. Likewise, the second battery holding space 72 is greater in width, or dimension parallel to the lateral (width) direction B of the vehicle than the first battery holding space 71, and approximately equal in dimension parallel to the longitudinal (length) direction A and dimension parallel to the vertical (height) direction C of the vehicle to the first battery holding space 71. Consequently, as compared with the first battery holding space 71, the second battery holding space 72 allows a large number of batteries 61 to be arranged therein. In the present example, two batteries 61 are arranged in the first battery holding space 71 while three batteries 61 are arranged in the second battery holding space 72.

Here, the group of batteries 61 arranged in the first battery accommodating portion 63 (first battery holding space 71) is referred to as a first battery, while the group of batteries 61 arranged in the second battery accommodating portion 64 (second battery holding space 72) is referred to as a second battery. The batteries 61 are electrically connected by wires, not shown. The number of the batteries is not limited to the above but may be changed appropriately depending on the amount of electricity required for the electric vehicle 1 and the size, properties, etc. of the battery 61.

The first battery accommodating portion 63, the second battery accommodating portion 64 and the partition 65 are each made of, for example a light metal such as aluminum. This makes it possible to realize a battery pack 60 reduced in weight and robust enough to withstand external forces. The above components of the battery housing 62 may be made of the same metal. This prevents corrosion of the joining elements 66 which join the components to construct the battery housing 62.

The second battery accommodating portion 64 is higher in stiffness than the first battery accommodating portion 63. Appropriate stiffnesses may be given to them, for example by making the second battery accommodating portion 64 thicker than the first battery accommodating portion 63. The reason for making the second battery accommodating portion 64 higher in stiffness than the first battery accommodating portion 63 is: while the first battery accommodating portion 63 is arranged between the side rails 11, and thus, protected by the side rails 11 against lateral collision, the second battery accommodating portion 64 is located below the side rails 11, and thus, desired to have enhanced lateral collision safety. Causing the first and second battery accommodating portions to have appropriate stiffnesses, respectively, leads to a reduction in weight of the first battery accommodating portion 63, and thus, of the battery pack 60 and improved lateral collision safety.

Appropriate stiffnesses may be realized by a method other than adjusting the thicknesses of the first and second battery accommodating portions. For example, appropriate stiffnesses may be realized by forming a first battery accommodating portion 63 by machining a sheet material obtained by rolling, while forming a second battery accommodating portion 64 by extruding or molding a relatively-thick and rigid bulky material. It corrosion of the joining elements 66 can be prevented, it is also possible to form a first battery accommodating portion 63 from a lighter material such as a resin, while forming a second battery accommodating portion 64 from a metal.

As shown in FIG. 2, when the battery housing 62 is arranged between the side rails 11, battery-side brackets, each constituting a support device described below, are attached to the laterally (vehicle-widthwise) outer surfaces 64c of the body 64a of the second battery accommodating portion 64, in support-device attachment areas 64d. In the present example, the laterally (vehicle-widthwise) outer surfaces 64c each have three support-device attachment areas 64d (thus, there are six support-device attachment areas in all). The number of the support-device attachment areas may be changed appropriately depending on the weight and size of the battery pack.

The support-device attachment areas 64d in which battery-side brackets, described below, are attached are desirably defined avoiding the welds 64e which join the body 64a and each side wall 64b. In the present example, the welds 64e are at the longitudinal (vehicle-lengthwise) ends of the battery housing 62, and thus, the support-device attachment areas 64d are defined to be away from each longitudinal end of the battery housing 62.

The reason is: the welds 64e are lower in stiffness than the other part, and thus, if a battery-side bracket is attached in a support-device attachment area 64d defined on a weld 64e, the weld 64e is greatly influenced by an external force transmitted via the battery-side bracket, which may lead to breakage of the weld 64d. When the support-device attachment areas 64 are defined in the part other than the welds, which is relatively high in stiffness, the influence of an external force transmitted via the battery-side brackets is reduced, leading to improved strength reliability of the battery housing 62. Thus, the battery pack 60 is mounted with a decrease in reliability suppressed.

If a weld 64e is not present at a longitudinal (vehicle-lengthwise) end of the battery housing 62, the support-device attachment area 64 may be defined at the longitudinal end. For example, if the second battery accommodating portion 64 is formed by welding two parts of identical shape, a weld 64e is produced at the longitudinal (vehicle-lengthwise) center of the battery housing 62. Thus, support-device attachment area 64d need to be defined to avoid the longitudinal center, but may be defined at a longitudinal (vehicle-lengthwise) end of the battery housing 62.

Figure 4:
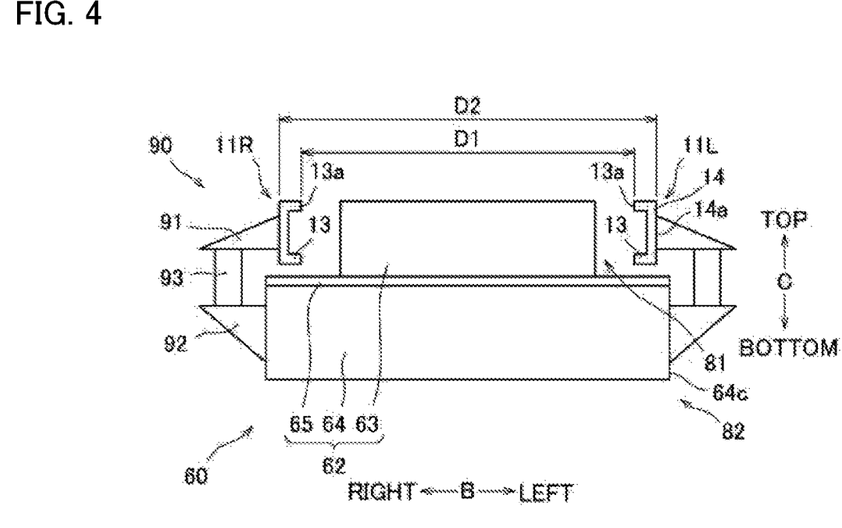
FIG. 4 is a front view showing how a battery pack is supported and attached to side rails with a support structure according to the first embodiment of the present invention.

Next, with reference to FIG. 4, how the battery pack 60 is arranged relative to the side rails 11 and supported with the support structure according to the first embodiment will be described. FIG. 4 is a front view showing how the battery pack 60 is supported and attached to the side rails 11 with the support structure according to the first embodiment.

As shown in FIG. 4, there is a first space 81 between the left and right side rails 11L, 11R, and vertically (vehicle-heightwise) below the first space 81 is present a second space 82. The battery housing 62 is arranged to extend across the boundary between the first and second spaces 81, 82.

Specifically, the battery housing 62 is arranged with the first battery accommodating portion 63 located in the first space 81. More specifically, in the battery housing to which the support device according to the first embodiment is applied, the first battery accommodating portion 63 is located between a laterally (vehicle-widthwise) inner edge 13a of a flange 13 of the left side rail 11L and a laterally (vehicle-widthwise) inner edge 13a of a flange 13 of the right side rail 11R. The first battery accommodating portion 63 has therefore a width, or dimension parallel the lateral (width) direction B of the vehicle smaller than the distance between the side rails. Here, the distance between the side rails means a distance D1 from the laterally (vehicle-widthwise) inner edge 13a of the flange 13 of the left side rail 11L to the laterally (vehicle-widthwise) inner edge 13a of the flange 13 of the right side rail 11R.

The battery housing 62 is arranged with the second battery accommodating portion 64 and the partition 65 located in the second space 82 below the side rails 11. In other words, the battery housing 62 is arranged with the second battery accommodating portion 64 and the partition 65 jointed to the first battery accommodating portion 63 in the second space 82.

In the battery housing to which the support device according to the first embodiment is applied, the second battery accommodating portion 64 and the partition 65 have a width, or dimension parallel to the lateral (width) direction B of the vehicle greater than a distance between webs of the side rails, not only the distance D1 between the side rails. Thus, the second battery accommodating portion 64 and the partition 65 project laterally beyond each side rail 11. Here, the distance between the webs means a distance D2 from the laterally (vehicle-widthwise) outer surface 14a of the web 14 of the left side rail 11L to the laterally (vehicle-widthwise) outer surface 14a of the web 14 of the right side rail 11R.

By using the battery housing 62 configured and arranged relative to the side rails 11 as described above, batteries 61 can be mounted using the space delimited by the side rails effectively, and thus, the electric vehicle 1 can have an increased battery on-board capacity.

In the battery housing to which the support device according to the first embodiment is applied, the second battery accommodating portion 64 has a width, or dimension parallel to the lateral (width) direction B of the vehicle greater than the distance between the webs of the side rails, which contributes to an increase in battery on-board capacity, while the first battery accommodating portion 63 is located between the side rails 11, which contributes to an improvement in lateral collision safety.

Although in the above-described battery housing, the first battery holding space 71 provided by the first battery accommodating portion 64 and the second battery holding space 72 provided by the second battery accommodating portion 64 are separated by the partition 65, the first and second accommodating portions may provide a single continuous holding space without a partition 65. In this case, batteries 61 may be arranged to extend across the boundary between the first and second battery accommodating portions 63, 64.

As seen from FIG. 4, in order to suspend the battery pack 60 comprising the batteries 61 held in the battery housing 62 to the side rails 11 in the above-described positional relationship to the side rails 11, support devices 90 according to the first embodiment are used. Each support device 90 comprises a frame-side bracket 91, a battery-side bracket 92 and a connecting member 93.

The frame-side bracket 91 is a relatively rigid structure made of, for example a metal. The frame-side bracket 91 is attached to the laterally (vehicle-widthwise) outer surface 14a of the web 14 of a side rail 11 by joining elements such as screws, not shown. The frame-side bracket 91 projects laterally (vehicle-widthwise) outward to provide a space allowing the connecting member 93 to be attached to extend in the vertical (height) direction C of the vehicle.

Also the battery-side bracket 92 is a relatively rigid structure made of, for example a metal. The battery-side bracket 92 is attached to a laterally (vehicle-widthwise) outer surface 64c of the second battery accommodating portion by joining elements such as screws, not shown. The battery-side bracket 92 projects laterally (vehicle-widthwise) outward to provide a space allowing the connecting member 93 to be attached to extend in the vertical (height) direction C of the vehicle.

The connecting member 93 is approximately in the shape of a cylinder or a truncated cone and made of an elastic material such as rubber. The connecting member 93 can thus absorb external forces acting in the longitudinal direction A, lateral (width) direction and vertical (height) direction C of the vehicle and forces resulting from combination of forces having these directions (forces having rotating direction, for example). The connecting member 93 is fixed to the those surfaces of the flame-side and battery-side brackets 91, 92 which face each other in the vertical (height) direction C of the vehicle. The connecting member 93 may be fixed to the flame-side and battery-side brackets 91, 92 by using joining elements such as screws or by recess-projection engagement (engagement of a projection of the connecting member or the bracket with a recess in the bracket or the connecting member) without using joining elements or by recess-projection engagement combined with use of joining elements.

By the connecting member 93 having desired elasticity, the second battery accommodating portion 64 and the battery-side bracket 92 are connected to the frame-side bracket 91, elastically. The battery pack 60 is thus suspended to the ladder frame 10 by the support devices each comprising the frame-side and the battery-side brackets 91, 92 elastically connected by the connecting member 93.

Consequently, if an external force causing vibration, etc. in the ladder frame is applied from a road surface via the wheel mechanisms 40 while the electric vehicle 1 is traveling, the influence of the external force on the battery pack 60 is reduced by the connecting member absorbing the external force, leading to improved reliability of the battery pack 60 mounted on the electric vehicle 1. The support device 90 according to the first embodiment can thus reduce the influence of external force, applied to the vehicle during traveling, upon the battery pack 60 configured to provide an increased battery on-board capacity for the electric vehicle 1, thereby improving the reliability of the battery pack 60.

Second Embodiment

Figure 5:
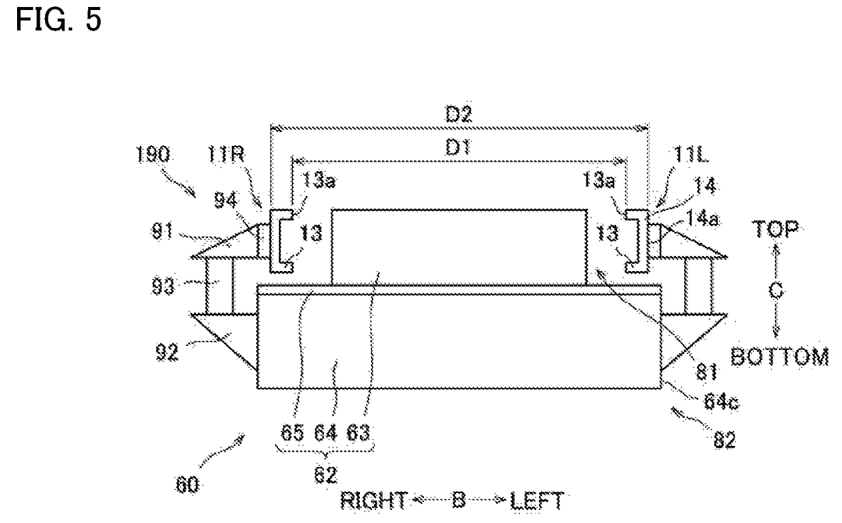
FIG. 5 is a front view showing how a battery pack is supported and attached to side rails with a support structure according to a second embodiment of the present invention.

Although in the first embodiment, the frame-side bracket 91 is directly attached to the side rail 11, the frame-side bracket 91 may be attached to the side rail 11 with an adjustment plate interposed between them for regulating the amount of lateral (vehicle-widthwise) projection of the frame-side bracket 91. With reference to FIG. 5, the support device configured this way will be described as a second embodiment. FIG. 5 is a front view showing how a battery pack is supported and attached to the side rails with a support structure according to the second embodiment. The components identical to those of the first embodiment are given the same reference signs and the description thereof will be omitted.

As shown in FIG. 5, the support device 190 according to the second embodiment includes an adjustment plate 94 in addition to a frame-side bracket 91, a battery-side bracket 92 and a connecting member 93. The adjustment plate 94 is attached to the laterally (vehicle-widthwise) outer surface 14a of the web 14 of a side rail 11. The frame-side bracket 91 is attached to the surface of the adjustment plate 94 opposite to the surface meeting the laterally (vehicle-widthwise) outer surface 14a of the web 14.

The adjustment plate 94 is composed of a plurality of metal components and has a known extensible structure which can vary the dimension parallel to the lateral (width) direction B of the vehicle. This makes it possible to regulate the amount of projection of the frame-side bracket 91 from the side rail 11. If the dimension of the second battery accommodating portion parallel to the lateral (width) direction B of the vehicle is changed, the connecting member 93 can be arranged at an appropriate position by regulating the amount of projection of the frame-side bracket 91 by means of the adjustment plate 94, without the need to change the dimensions of the frame-side and battery-side brackets 91, 92 parallel to the lateral (width) direction B of the vehicle. This eliminates the need to prepare a variety of frame-side and battery-side brackets 91, 92 different in size according to battery packs 60 different in size, thus allowing standardization of components, leading to a reduction in cost related to supporting the battery pack 60.

For example, if the laterally (vehicle-widthwise) outer surface 64c of the second battery accommodating portion 64 is located greatly outward of the laterally (vehicle-widthwise) outer surface 14a of the web 14, the adjustment plate 94 is extended in the lateral (width) direction B of the vehicle to increase the amount of projection of the frame-side bracket 91. If the laterally (vehicle-widthwise) outer surface 64c of the second battery accommodating portion 64 is located inward of the laterally (vehicle-widthwise) outer surface 14a of the web 14, the adjustment plate 94 is contracted in the lateral (width) direction B of the vehicle to reduce the amount of projection of the frame-side bracket 91.

If the second battery accommodating portion 64 has a dimension parallel to the lateral (width) direction B of the vehicle smaller than the distance D2 between the webs of the side rails 11, an adjustment plate may be provided at a laterally (vehicle-widthwise) outer surface 64c of the second battery accommodating portion 64 to regulate the amount of projection of the battery-side bracket 92. This configuration makes it easy to regulate the size of the support device 90 in response to a change in size of the battery pack 60, leading to a reduction in cost related to supporting the battery pack 60.

Third Embodiment

Figure 6:
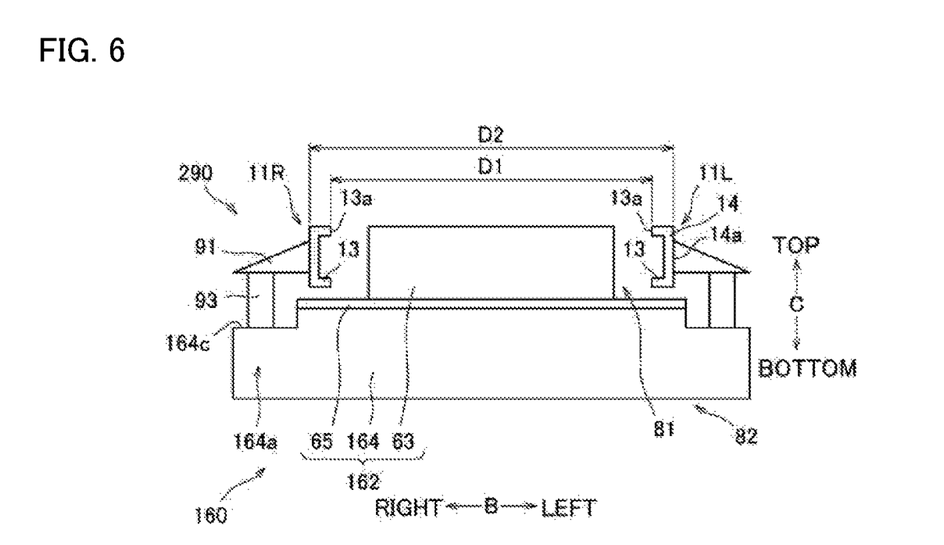
FIG. 6 is a cross-sectional view showing how a battery pack is supported and attached to side rails with a support structure according to a third embodiment of the present invention.

Although in the first and second embodiments, the connected member 93 is connected to the frame-side and battery-side brackets 91, 92 at the opposite ends, the support device may be configured such that the connecting member 93 is connected directly to the second battery accommodating portion 93. With reference to FIG. 6, the support device configured this way will be described as a third embodiment. FIG. 6 is a front view showing how a battery pack is supported and attached to the side rails with a support structure according to the third embodiment. The components identical to those of the first embodiment, are given the same reference signs and the description thereof will be omitted.

As shown in FIG. 6, the third embodiment is applied to a battery pack 160 having a battery housing 162 different in shape than the battery housing 62 to which the first embodiment is applied. Specifically, the second battery accommodating portion 164 constituting the battery housing 162 is not a rectangle but an inverted T (i.e. convex type) when viewed from the front. Thus, the second battery accommodating portion 164 has a small height in lateral (vehicle-widthwise) end portions 164a as compared with the other portion. In other words, the second battery accommodating portion 164 includes sunken portions at the lateral (vehicle-width) ends.

As shown in FIG. 6, the support device 290 according to the third embodiment comprises a frame-side bracket 91 and a connecting member 93. The connecting member 93 is connected to the frame-side bracket 91 at one end and connected directly to the upper surface 164c of the lateral end (sunken) portion 164a of the second battery accommodating portion 164 at the other end. Although not shown, the upper surface 164a may have a recess or projection to engage with a projection or recess of the connecting member 93 in order to connect the connecting member to the second battery housing member by recess-projection engagement.

The third embodiment, which does not require a battery bracket 92, is composed of a reduced number of components, leading to a reduction in cost of the support device 290, and thus, the electric vehicle 1 equipped with the support devices 290.

REFERENCE SIGNS LIST

1 Electric vehicle
10 Ladder frame
11 Side rail
11L Left side rail
11R Right side rail
12 Cross-member
13 Flange
13a Laterally (vehicle-widthwise) inner edge
14 Web
14a Laterally (vehicle-widthwise) outer surface
20 Cab
30 Cargo box
40 Wheel mechanism
41 Front wheel
42 Front axle
43 Rear wheel
44 Rear axle
50 Drive apparatus
51 Motor unit
52 Gear unit
53 Motor 54 Motor sousing
55 Speed reducing mechanism
56 Differential mechanism
57 Gear sousing
60 Battery pack
61 Battery
62 Battery housing
63 First battery accommodating portion
63a Body
63b Side wall
64 Second battery accommodating portion
64a Body
64b Side wall
64c Lateral (vehicle-widthwise) outer surface
64d Support device attachment area
64e Weld
65 Partition
66 Joining element
71 First battery holding space
72 Second battery holding space
81 First space
82 Second space
90 Support device
91 Frame-side bracket
92 Battery-side bracket
A Longitudinal direction of the vehicle
B Lateral (width) direction of the vehicle
C Vertical (height) direction of the vehicle

The invention claimed is:

1. A support device of a vehicle battery pack of a vehicle, wherein the vehicle battery pack includes a first battery accommodating portion disposed in a first space of the vehicle and a second battery accommodating portion, wherein the second battery accommodating portion is greater in a vehicle-widthwise dimension than the first battery accommodating portion, wherein the second battery accommodating portion is connected to the first battery accommodating portion, wherein the second battery accommodating portion is disposed in a second space, and wherein the second space is below the first space in a vehicle-heightwise dimension, comprising:
 a frame-side bracket disposed at a vehicle-widthwise outer surface of a web of a side rail of a ladder frame of the vehicle and projecting outward in a vehicle-widthwise direction; and
 a connecting member elastically connecting the second battery accommodating portion to the frame-side bracket to suspend the vehicle battery pack to the ladder frame.

2. The support device according to claim 1 further comprising a battery-side bracket disposed at a vehicle-widthwise outer surface of the second battery accommodating portion and projecting outward in the vehicle-widthwise direction.

3. The support device according to claim 2, wherein the battery-side bracket is disposed such that a weld included in a housing composed of the first and the second battery accommodating portions is avoided.

4. The support device according to claim 3, wherein the battery-side bracket is disposed at a location away from a vehicle-longitudinal end of the housing.

5. The support device according to claim 1, wherein the frame-side bracket is connected to the web of the side rail with an adjustment plate interposed between the frame-side bracket and the web.

* * * * *